US009549653B1

(12) United States Patent
Kapuriya

(10) Patent No.: US 9,549,653 B1
(45) Date of Patent: Jan. 24, 2017

(54) TOY GATHERING AND STORAGE DEVICE

(71) Applicant: Vatsal Kapuriya, Monroe, NJ (US)

(72) Inventor: Vatsal Kapuriya, Monroe, NJ (US)

( * ) Notice: Subject to any disclaimer, the term of this patent is extended or adjusted under 35 U.S.C. 154(b) by 0 days.

(21) Appl. No.: 14/932,276

(22) Filed: Nov. 4, 2015

(51) Int. Cl.
*A01K 29/00* (2006.01)
*A47L 13/00* (2006.01)
*F16M 13/02* (2006.01)
*B65D 30/00* (2006.01)
*B65D 33/14* (2006.01)
*B65D 33/28* (2006.01)
*B25G 1/10* (2006.01)
*F16B 1/00* (2006.01)

(52) U.S. Cl.
CPC ............... *A47L 13/00* (2013.01); *B25G 1/102* (2013.01); *B65D 29/00* (2013.01); *B65D 33/14* (2013.01); *B65D 33/28* (2013.01); *F16M 13/02* (2013.01); *F16B 2001/0028* (2013.01)

(58) Field of Classification Search
CPC ......... E01H 1/1206; A01B 1/02; A47L 13/52; A47L 13/00; B25J 1/04; A01K 1/0107; A01D 7/10; F16M 13/02; B65D 29/00; B65D 33/14; B65D 33/28; B25G 1/102; F16B 2001/0028
USPC ........................... 294/1.4, 1.5; D30/161, 162
See application file for complete search history.

(56) References Cited

U.S. PATENT DOCUMENTS 1,266,522 A 5/1918 Oldham
D285,012 S * 8/1986 Willis ............................ 294/1.4
5,050,920 A 9/1991 Potticary
D341,934 S 12/1993 Abraham
5,498,046 A * 3/1996 Ridley, Sr. ............. A01D 51/00 15/257.1
D375,332 S 11/1996 Kino
6,260,895 B1 * 7/2001 Nichols ................. E01H 1/1206 15/104.8
6,478,351 B1 * 11/2002 Nelson .................. E01H 1/1206 15/257.2
6,520,554 B2 2/2003 Ditzik
6,641,188 B2 * 11/2003 Arceo ................... E01H 1/1206 15/257.3
7,374,135 B2 * 5/2008 Romero .................. B65B 67/12 248/95
2005/0071943 A1 * 4/2005 Liu ......................... A47L 13/52 15/257.2
2014/0150397 A1 6/2014 Palmer

* cited by examiner

*Primary Examiner* — Stephen Vu

(57) ABSTRACT

A toy gathering and storage device for gathering and storing toys includes a rake that has a handle which comprises an exterior section and an interior section, such that the handle is extendable. A top edge of a slat is coupled to a bottom end of the exterior section. A plurality of claws is coupled to and extends from a bottom edge of the slat. The device includes a collector that has a rod which comprises an inner section and an outer section, such that the rod is extendable. A bracket is coupled to and extends from a bottom terminus of the outer section. A pan is pivotally coupled to the bracket. A bag, which is flexible, is positionable around the pan and the bracket. The bag is couplable to the bracket.

19 Claims, 6 Drawing Sheets

TOY GATHERING AND STORAGE DEVICE

BACKGROUND OF THE DISCLOSURE

Field of the Disclosure

The disclosure relates to gathering and storage devices and more particularly pertains to a new gathering and storage device for gathering and storing toys.

SUMMARY OF THE DISCLOSURE

An embodiment of the disclosure meets the needs presented above by generally comprising a rake that has a handle which comprises an exterior section and an interior section, such that the handle is extendable. A top edge of a slat is coupled to a bottom end of the exterior section. A plurality of claws is coupled to and extends from a bottom edge of the slat. The device includes a collector that has a rod which comprises an inner section and an outer section, such that the rod is extendable. A bracket is coupled to and extends from a bottom terminus of the outer section. A pan is pivotally coupled to the bracket. A bag, which is flexible, is positionable around the pan and the bracket. The bag is couplable to the bracket.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
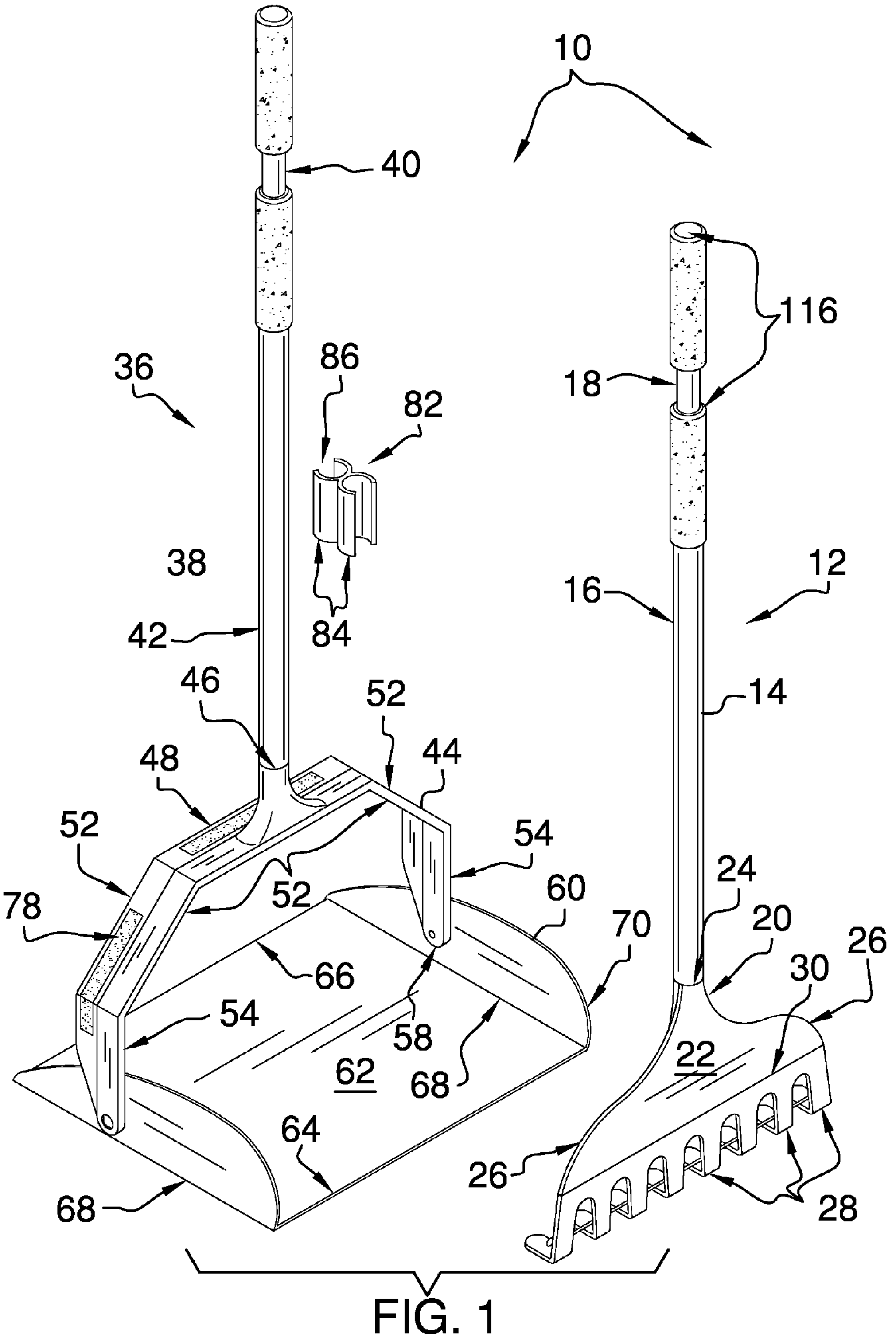
FIG. 1 is an isometric perspective view of a toy gathering and storage device according to an embodiment of the disclosure.
Figure 2:
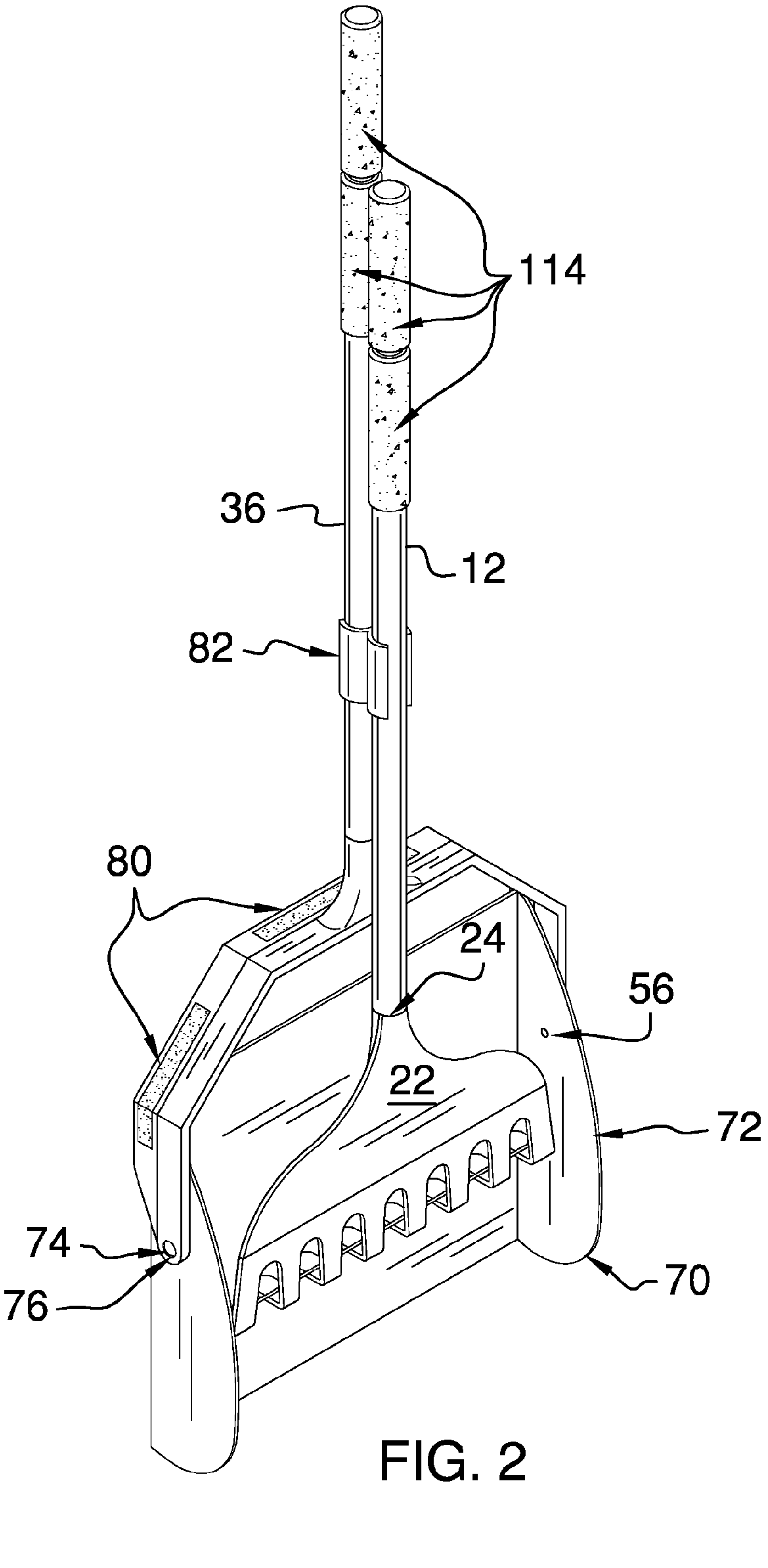
FIG. 2 is an isometric perspective view of an embodiment of the disclosure.
Figure 3:
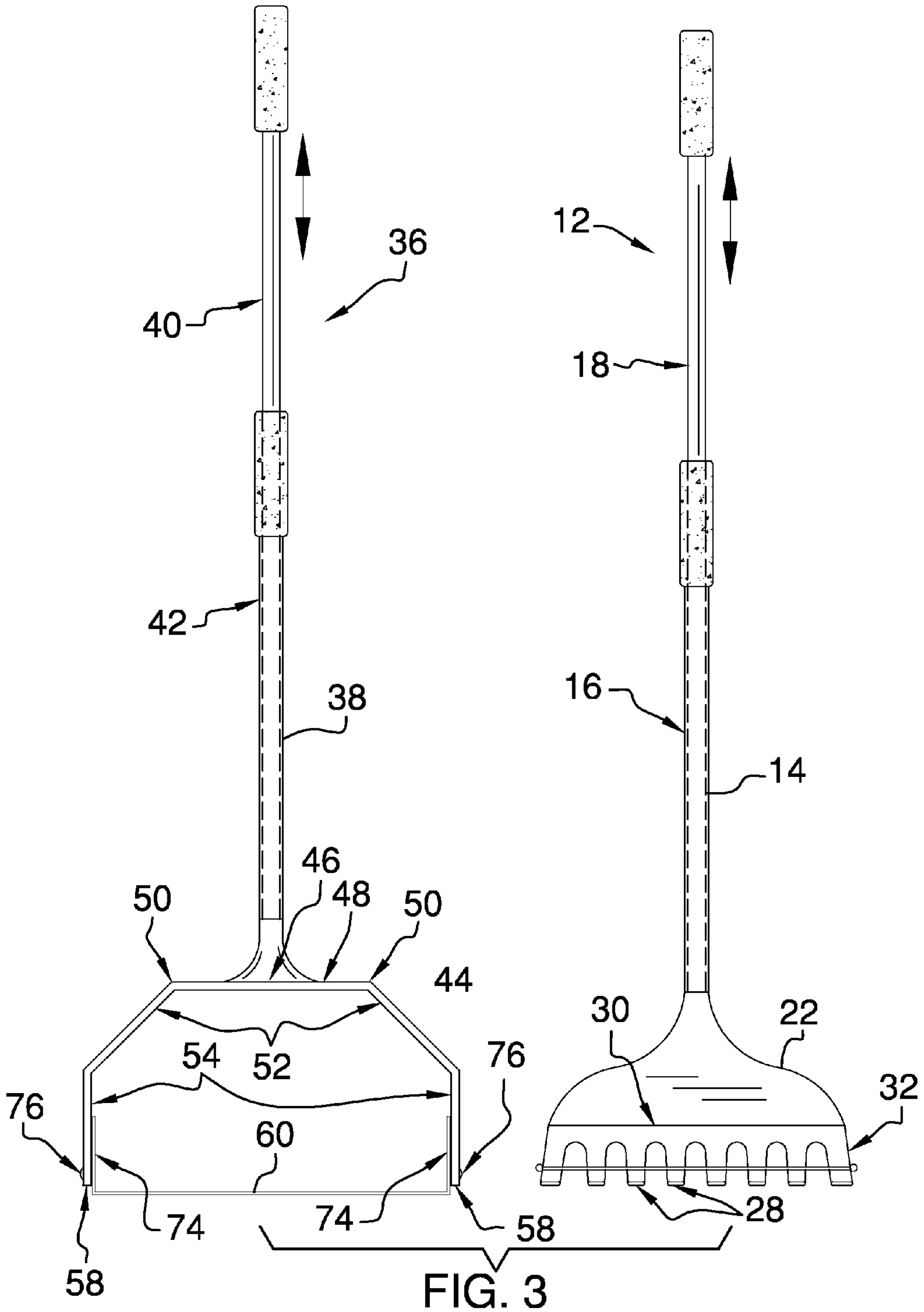
FIG. 3 is a rear view of an embodiment of the disclosure.
Figure 4:
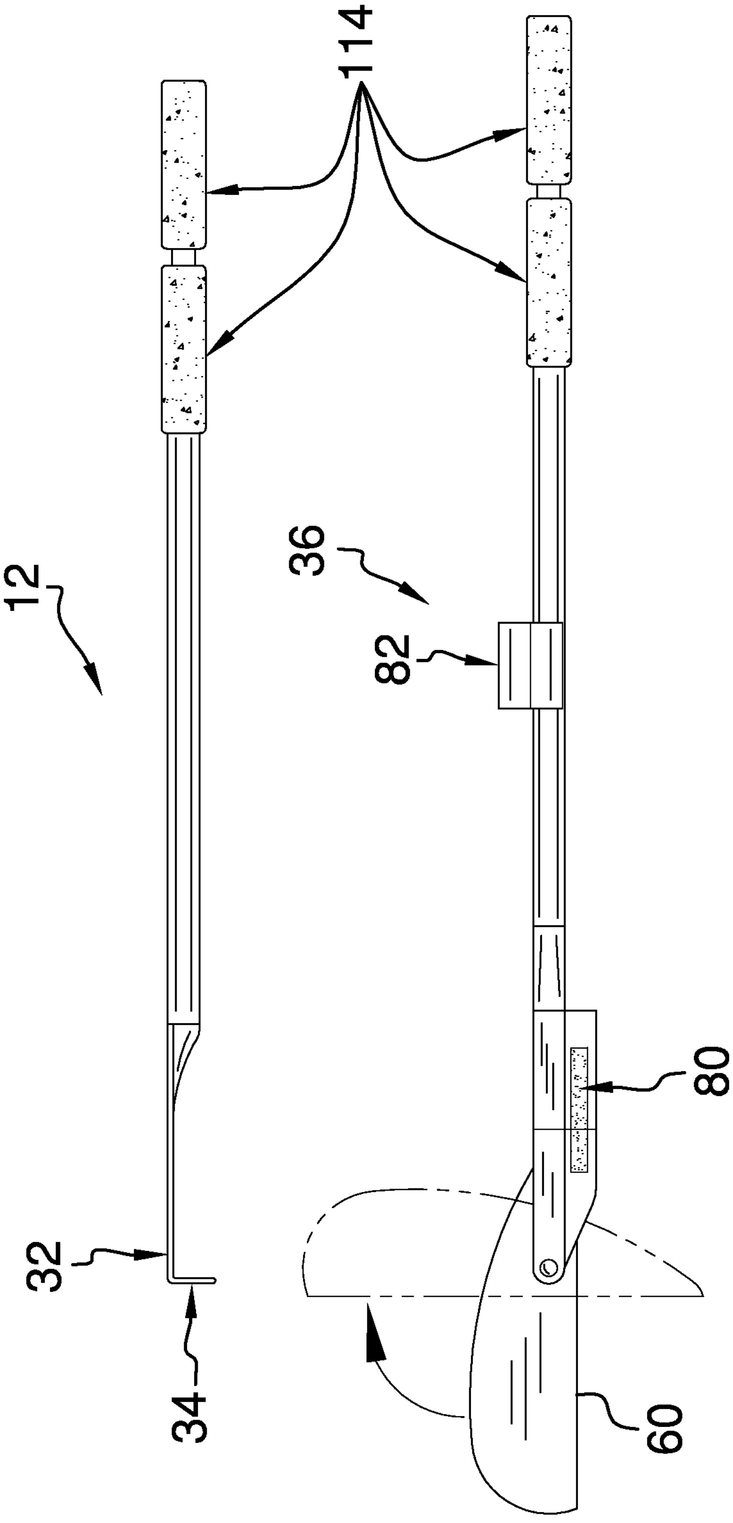
FIG. 4 is a side view of an embodiment of the disclosure.
Figure 5:
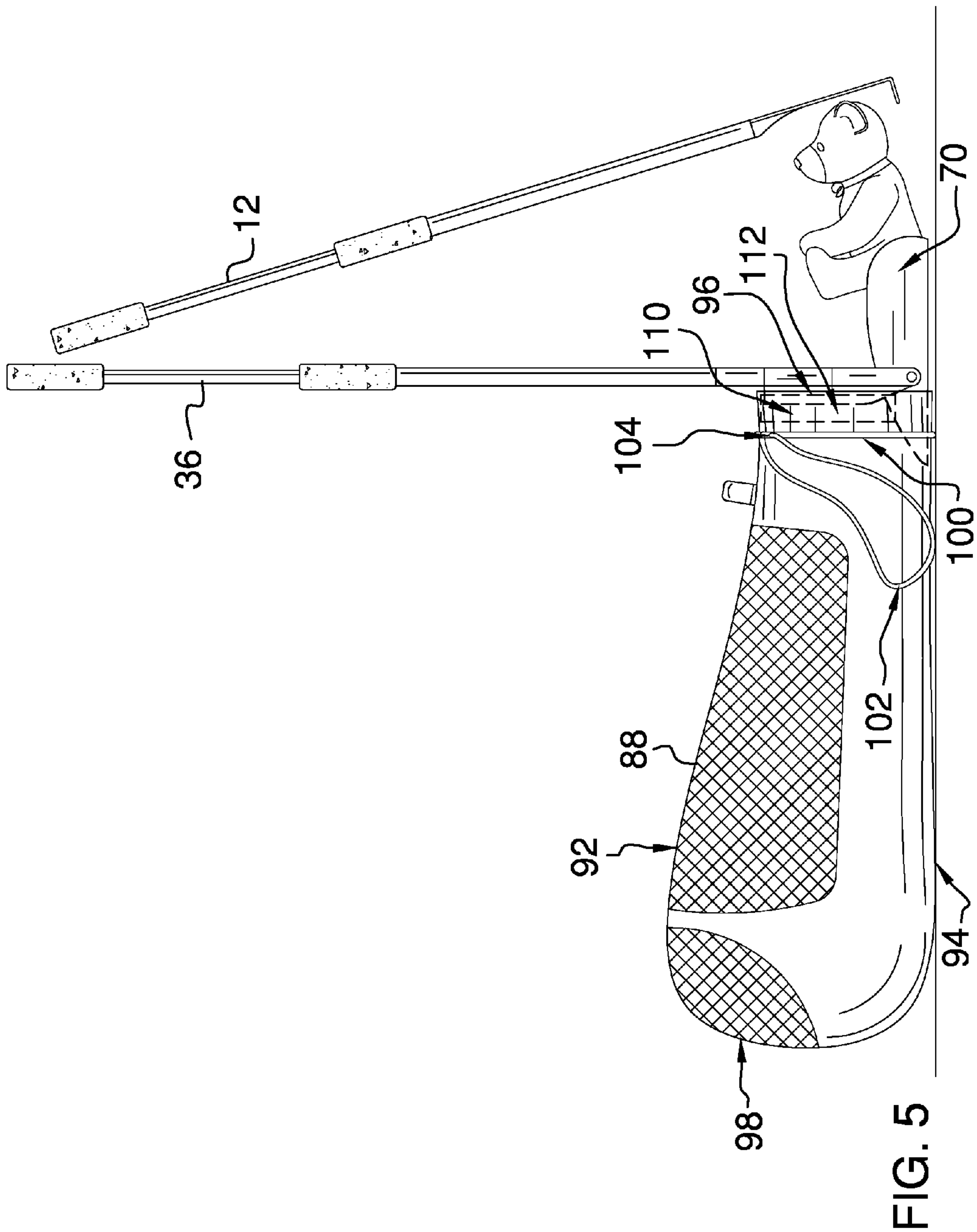
FIG. 5 is an in-use view of an embodiment of the disclosure.
Figure 6:
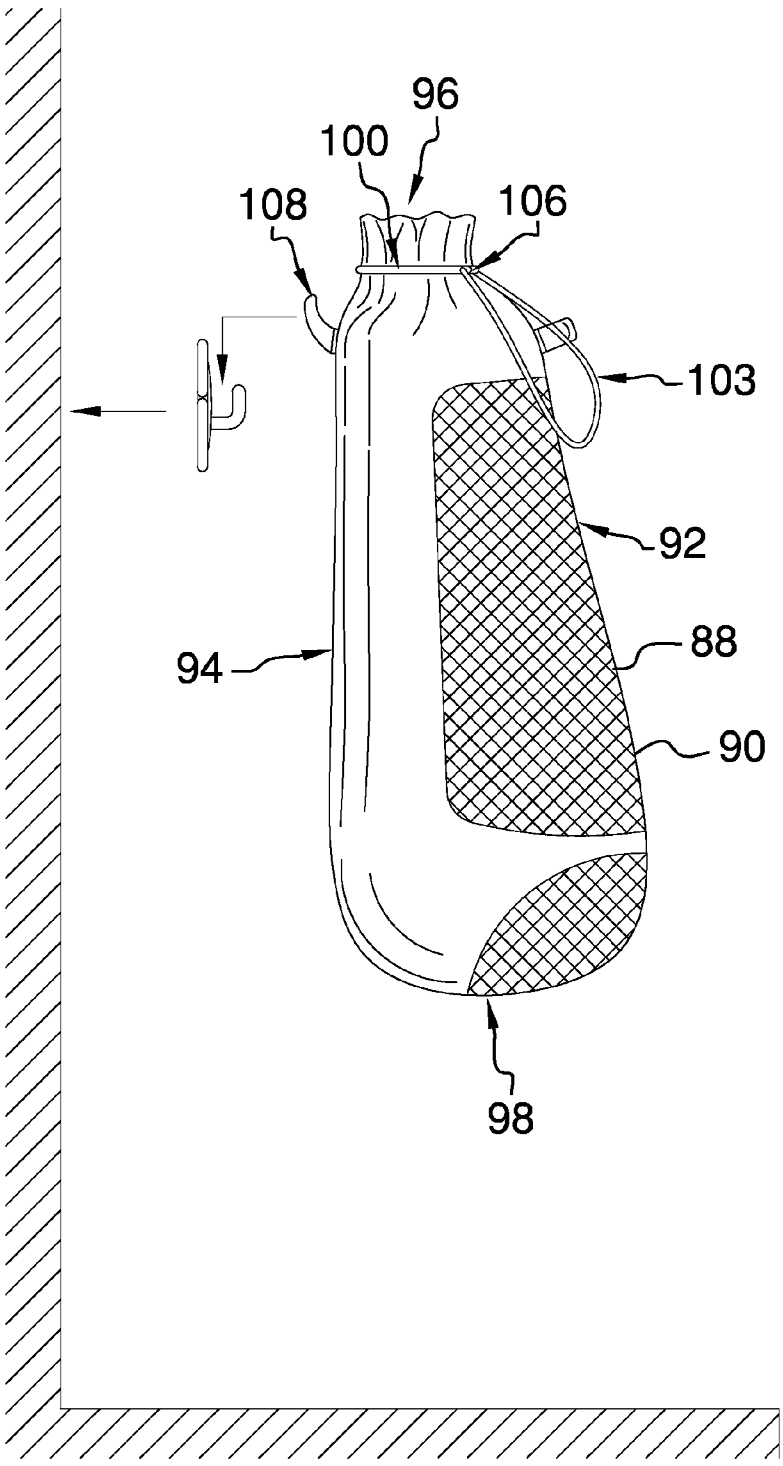
FIG. 6 is an in-use view of an embodiment of the disclosure.

With reference now to the drawings, and in particular to FIGS. 1 through 6 thereof, a new gathering and storage device embodying the principles and concepts of an embodiment of the disclosure and generally designated by the reference numeral 10 will be described.

As best illustrated in FIGS. 1 through 6, the toy gathering and storage device 10 generally comprises a rake 12 that comprises a handle 14. The handle 14 comprises an exterior section 16 and an interior section 18, such that the handle 14 is extendable. The handle 14 is round when viewed longitudinally. A top edge 20 of a slat 22 is coupled to a bottom end 24 of the exterior section 16. The slat 22 is rigid and has opposing sides 26. The opposing sides are S-shaped, such that the top edge 20 is tapered. A plurality of claws 28 is coupled to and extends from a bottom edge 30 of the slat 22. Each claw 28 comprises a first segment 32 coupled to the bottom edge 30. The first segment 32 is substantially coplanar with the slat 22. Each claw 28 has a second segment 34 coupled to a respective first segment 32 distally from the bottom edge 30. Preferably, the first segment 32 and the second segment 34 are coupled at substantially 90 degrees.

The device 10 also comprises a collector 36, which in turn comprises a rod 38 having an inner section 40 and an outer section 42, such that the rod 38 is extendable. The rod 38 is round when viewed longitudinally. A bracket 44 is coupled to and extends from a bottom terminus 46 of the outer section 42. The bracket 44 comprises a lateral 48 that has opposing ends 50. Each of a pair of diagonals 52 is coupled to a respective opposing end 50, and each of a pair of verticals 54 is coupled to a respective diagonal 52 distal from the respective opposing end 50, such that the pair of opposing verticals 54 is coplanar and parallel. Each of a first pair of pivot holes 56 is positioned in a respective vertical 54 proximate to a free end 58 of the vertical 54.

A pan 60 is pivotally coupled to respective free ends 58 of the verticals 54. The pan 60 comprises a panel 62 that has a front edge 64, a back edge 66, and a pair of side edges 68. Each of a pair of guides 70 is coupled to a respective side edge 68. Preferably, the guides 70 are substantially perpendicular to the panel 62. The guides 70 each have an upper edge 72 that is elliptically curved, such that the guide 70 is dimensionally taller proximate to the front edge 64 relative to the back edge 66. Each of a second pair of pivot holes 74 is positioned in a respective guide 70. The second pair of pivot holes 74 is biased toward the back edge 66 of the panel 62. The collector 36 includes a pair of pivot pins 76 that is complimentary to the first pair of pivot holes 56 and the second pair of pivot holes 74. Each pivot pin 76 is insertable through a respective one of the first pair of pivot holes 56 and a respective one of the second pair of pivot holes 74 to pivotally couple the pan 60 to the bracket 44. With the second pair of pivot holes 74 biased toward the back edge 66 of the panel 62, the pan 60 is pivotable to a horizontal position when contacted with a floor surface and pivotable to a vertical position when the pan 60 is lifted away from the floor surface.

Each of a plurality of first fasteners 78 is coupled to the bracket 44. Preferably, the plurality of first fasteners comprises 78 a trio of first fasteners 80 coupled singularly to the lateral 48 and the pair of diagonals 52.

The device 10 also includes a clip 82 that is configured to reversibly couple to the handle 14 and the rod 38. The clip 82 allows the rake 12 and the collector 36 to be coupled together for storage purposes. The clip 82 comprises a pair of tubes 84 that is deformable. Each tube 84 has a longitudinal slit 86. The tubes 84 are mutually coupled opposite the longitudinal slits 86. The rod 38 and the handle 14 are insertable into respective tubes 84 through a respective the longitudinal slit 86 and frictionally coupled to the tubes 84.

The device 10 also includes a bag 88 that is flexible. The bag 88 is positionable around the pan 60 and the bracket 44 and couplable to the bracket 44. More specifically, the bag 88 comprises a shell 90 that is flexible. The shell 90 has a front face 92, a back face 94, an open end 96 and a closed end 98. The front face 92 is meshed and the back face 94 is solid. The closed end 98 is meshed proximate to the front face 92 and solid proximate to the back face 94. Preferably, the shell 90 comprises polyester. A sleeve 100 is coupled to the shell 90 proximate to the open end 96 and a drawstring 102 is positioned in the sleeve 100. The drawstring 102 comprises a loop 103 that extends from a penetration 104 in the sleeve 100. The drawstring 102 is configured to be pulled by the user to close or partially close the open end 96 of the shell. A lock 106 is positioned on the drawstring 102 and reversibility couplable to the drawstring 102. The lock 106 is positioned on the drawstring 102 and movable to a desired position on the drawstring 102, such that the drawstring 102 can be locked at a desired length.

A coupler 108 is coupled to the back face 94 of the shell 90 proximate to the sleeve 100. The coupler 108 is positioned on the shell 90 such that the shell 90 is configured to couple to a hook attached to a wall.

Each of a plurality of second fasteners 110 is coupled to the shell 90 proximate to the open end 96. The second fasteners 110 are complimentary to the first fasteners 78. Preferably, the plurality of second fasteners 110 comprises a trio of second fasteners 112 coupled proximate to the open end 96 and the front face 92. The first fasteners 78 and the second fasteners 110 may be selected from the group of fasteners consisting of hook type and loop type fasteners. The shell 90 is positionable around the back edge 66 of the pan 60 and the bracket 44, such that the second fasteners 110 are positioned to couple with the first fasteners 78 to secure the shell 90 to the collector 36.

Each of a set of four grips 114 is coupled singularly proximate to top ends 116 of the exterior section 16 and the interior section 18 of the handle 14, and to top termini 118 of the outer section 42 and the inner section 40 of the rod 38. The grips 114 are pliable.

In use, the handle 14 of the rake 12 and the rod 38 of the collector 36 are adjustable to desired lengths for collecting toys into the bag 88. The rake 12 is used to propel the toys through the open end 96 of the shell 90, which is positioned over the back edge 66 of the pan 60 and coupled to the bracket 44. The guides 70 assist in directing the toys through the open end 96 of the shell 90.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A toy gathering and storage device comprising:

a rake, said rake comprising:

a handle, said handle comprising an exterior section and an interior section, such that said handle is extendable, a slat, said slat having a top edge coupled to a bottom end of said exterior section, and a plurality of claws, said claws being coupled to and extending from a bottom edge of said slat;

a collector, said collector comprising:

a rod, said rod comprising an inner section and an outer section, such that said rod is extendable, a bracket, said bracket being coupled to and extending from a bottom terminus of said outer section, and a pan, said pan being pivotally coupled to said bracket;

a clip, said clip being configured to reversibly couple to said handle and said rod, wherein said rake and said collector can be coupled together using said clip such that said rake and said collector are configured for storage, said clip comprising:

a pair of tubes, said tubes being deformable, each said tube having a longitudinal slit, said tubes being mutually coupled opposite said longitudinal slits, and wherein said rod and said handle are insertable into respective said tubes through a respective said longitudinal slit and frictionally coupled to said tubes; and a bag, said bag being flexible, said bag being positionable around said pan and said bracket, said bag being couplable to said bracket.

2. The device of claim 1, further comprising:

said slat being rigid;

said slat having a bottom edge and opposing sides;

each said claw comprising a first segment coupled to said bottom edge; and each said claw having a second segment coupled to a respective said first segment distally from said bottom edge.

3. The device of claim 2, further including said first segment being substantially coplanar with said slat.

4. The device of claim 2, further including said first segment and said second segment being coupled at substantially 90 degrees.

5. The device of claim 1, further including said handle and said rod being round when viewed longitudinally.

6. The device of claim 1, further comprising:

said handle being round when viewed longitudinally, said slat being rigid, said slat having a bottom edge and opposing sides, said opposing sides being S-shaped, such that said top edge is tapered, each said claw comprising a first segment coupled to said bottom edge, said first segment being substantially coplanar with said slat, each said claw having a second segment coupled to a respective said first segment distally from said bottom edge, said first segment and said second segment being coupled at substantially 90 degrees, said rod being round when viewed longitudinally, said bracket comprising:

a lateral having opposing ends, a pair of diagonals, each said diagonal being coupled to a respective said opposing end, a pair of verticals, each said vertical being coupled to a respective said diagonal distal from said respective said opposing end, such that said pair of opposing verticals are coplanar and parallel, a first pair of pivot holes, each said first pair of pivot holes being positioned in a respective said vertical proximate to a free end of said vertical, and a pan, said pan being pivotally coupled to respective free ends of said verticals, said pan comprising:

a panel, said panel having a front edge, a back edge, and a pair of side edges, a pair of guides, each said guide being coupled to a respective said side edge such that said guides are substantially perpendicular to said panel, said guides having an upper edge, said upper edge being elliptically curved, such that said guide is dimensionally taller proximate to said front edge relative to said back edge, a second pair of pivot holes, each of said second pair of pivot holes being positioned in a respective said guide, said second pair of pivot holes being biased toward said back edge of said panel, a pair of pivot pins, said pivot pins being complimentary to said first pair of pivot holes and said second pair of pivot holes, such that each said pivot pin is insertable through a respective one of said first pair of pivot holes and a respective one of said second pair of pivot holes to pivotally couple said pan to said bracket, wherein said pan is pivotable to a horizontal position when contacted with a floor surface and pivotable to a vertical position when said pan is lifted away from the floor surface, a plurality of first fasteners, said plurality of first fasteners being coupled to said bracket, said plurality of first fasteners comprising a trio of first fasteners coupled singularly to said lateral and said pair of diagonals, said bag comprising:

a shell, said shell being flexible, said shell having a front face, a back face, an open end and a closed end, said front face being meshed, said back face being solid, said closed end being meshed proximate to said front face and solid proximate to said back face, said shell comprising polyester, a sleeve, said sleeve being coupled to said shell proximate to said open end, a drawstring, said drawstring being positioned in said sleeve, said drawstring comprising a loop extending from a penetration in said sleeve, such that said drawstring is configured to be pulled by the user to close or partially close said open end of said shell, a lock, said lock being positioned on said drawstring and reversibility couplable to said drawstring, such that said lock is positioned on said drawstring and movable to a desired position on said drawstring, wherein said drawstring can be lock at a desired length, a coupler, said coupler being coupled to said back face of said shell proximate to said sleeve, such that said coupler is positioned on said shell wherein said shell is configured to couple to a hook attached to a wall, a plurality of second fasteners, said second fasteners being complimentary to said first fasteners, said second fasteners being coupled to said shell proximate to said open end, said plurality of second fasteners comprising a trio of second fasteners proximate to said open end and said front face, such that said second fasteners are positioned to couple to said first fasteners to secure said bag to said bracket, and wherein said shell is positionable around said back edge of said pan and said bracket, such that said second fasteners are positioned to couple with said first fasteners to secure said shell to said collector, a set of four grips, said grips being coupled singularly proximate to a top end of said exterior section, a top end of said interior section, a top terminus of said outer section, and a top terminus of said inner section, said grips being pliable; and said first fasteners and said second fasteners being selected from the group of fasteners consisting of hook type and loop type fasteners.

7. A toy gathering and storage device comprising:

a rake, said rake comprising:

a handle, said handle comprising an exterior section and an interior section, such that said handle is extendable, a slat, said slat being rigid, said slat having a top edge coupled to a bottom end of said exterior section, said slat having a bottom edge and opposing sides, said opposing sides being S-shaped, such that said top edge is tapered, and a plurality of claws, said claws being coupled to and extending from a bottom edge of said slat, each said claw comprising a first segment coupled to said bottom edge, each said claw having a second segment coupled to a respective said first segment distally from said bottom edge;

a collector, said collector comprising:

a rod, said rod comprising an inner section and an outer section, such that said rod is extendable, a bracket, said bracket being coupled to and extending from a bottom terminus of said outer section, and a pan, said pan being pivotally coupled to said bracket;

a clip, said clip being configured to reversibly couple to said handle and said rod, wherein said rake and said collector can be coupled together using said clip such that said rake and said collector are configured for storage; and a bag, said bag being flexible, said bag being positionable around said pan and said bracket, said bag being couplable to said bracket.

8. A toy gathering and storage device comprising:

a rake, said rake comprising:

a handle, said handle comprising an exterior section and an interior section, such that said handle is extendable, a slat, said slat having a top edge coupled to a bottom end of said exterior section, and a plurality of claws, said claws being coupled to and extending from a bottom edge of said slat;

a collector, said collector comprising:

a rod, said rod comprising an inner section and an outer section, such that said rod is extendable, a bracket, said bracket being coupled to and extending from a bottom terminus of said outer section, and a pan, said pan being pivotally coupled to said bracket;

a clip, said clip being configured to reversibly couple to said handle and said rod, wherein said rake and said collector can be coupled together using said clip such that said rake and said collector are configured for storage; and a bag, said bag being flexible, said bag being positionable around said pan and said bracket, said bag being couplable to said bracket;

said bracket comprising:

a lateral having opposing ends, a pair of diagonals, each said diagonal being coupled to a respective said opposing end, a pair of verticals, each said vertical being coupled to a respective said diagonal distal from said respective said opposing end, said pan being pivotally coupled to respective free ends of said verticals, and a first pair of pivot holes, each said first pair of pivot holes being positioned in a respective said vertical proximate to a free end of said vertical;

said pan comprising:

a panel, said panel having a front edge, a back edge, and a pair of side edges, a pair of guides, each said guide being coupled to a respective said side edge, and a second pair of pivot holes, each of said second pair of pivot holes being positioned in a respective said guide;

a plurality of first fasteners, said plurality of first fasteners being coupled to said bracket;

a pair of pivot pins, said pivot pins being complimentary to said first pair of pivot holes and said second pair of pivot holes, such that each said pivot pin is insertable through a respective one of said first pair of pivot holes and a respective one of said second pair of pivot holes to pivotally couple said pan to said bracket; and wherein said pan is pivotable to a horizontal position when contacted with a floor surface and pivotable to a vertical position when said pan is lifted away from the floor surface.

9. The device of 8, further including each said vertical being coupled to a respective said diagonal distal from said respective said opposing end, such that said pair of opposing verticals are coplanar and parallel.

10. The device of claim 8, further including each said guide being coupled to a respective said side edge such that said guides are substantially perpendicular to said panel.

11. The device of claim 8, further including said guides having an upper edge, said upper edge being elliptically curved, such that said guide is dimensionally taller proximate to said front edge relative to said back edge.

12. The device of 8, further including said second pair of pivot holes being biased toward said back edge of said panel.

13. The device of claim 8, further including said bag comprising:

a shell, said shell being flexible, said shell having a front face, a back face, an open end and a closed end;

a sleeve, said sleeve being coupled to said shell proximate to said open end;

a drawstring, said drawstring being positioned in said sleeve, said drawstring comprising a loop extending from a penetration in said sleeve, such that said drawstring is configured to be pulled by the user to close or partially close said open end of said shell;

a lock, said lock being positioned on said drawstring and reversibility couplable to said drawstring, such that said lock is positioned on said drawstring and movable to a desired position on said drawstring, wherein said drawstring can be lock at a desired length;

a plurality of second fasteners, said second fasteners being complimentary to said first fasteners, said second fasteners being coupled to said shell proximate to said sleeve; and wherein said shell is positionable around said back edge of said pan and said bracket, such that said second fasteners are positioned to couple with said first fasteners to secure said shell to said collector.

14. The device of claim 13, further including said front face being meshed, said back face being solid, said closed end being meshed proximate to said front face and solid proximate to said back face.

15. The device of claim 13, further including said shell comprising polyester.

16. The device of claim 13, further including a coupler, said coupler being coupled to said back face of said shell proximate to said sleeve, such that said coupler is positioned on said shell wherein said shell is configured to couple to a hook attached to a wall.

17. The device of claim 13, further including said plurality of first fasteners comprising a trio of first fasteners coupled singularly to said lateral and said pair of diagonals, said plurality of second fasteners comprising a trio of second fasteners coupled to said shell proximate to said open end and said front face, such that said second fasteners are positioned to couple to said first fasteners to secure said bag to said bracket.

18. The device of claim 17, further including said first fasteners and said second fasteners being selected from the group of fasteners consisting of hook and loop fasteners.

19. A toy gathering and storage device comprising:

a rake, said rake comprising:

a handle, said handle comprising an exterior section and an interior section, such that said handle is extendable, a slat, said slat having a top edge coupled to a bottom end of said exterior section, and a plurality of claws, said claws being coupled to and extending from a bottom edge of said slat;

a collector, said collector comprising:

a rod, said rod comprising an inner section and an outer section, such that said rod is extendable, a bracket, said bracket being coupled to and extending from a bottom terminus of said outer section, and a pan, said pan being pivotally coupled to said bracket;

a clip, said clip being configured to reversibly couple to said handle and said rod, wherein said rake and said collector can be coupled together using said clip such that said rake and said collector are configured for storage; and a bag, said bag being flexible, said bag being positionable around said pan and said bracket, said bag being couplable to said bracket; and a set of four grips, said grips being coupled singularly proximate to a top end of said exterior section, a top end of said interior section, a top terminus of said outer section, and a top terminus of said inner section, said grips being pliable.

* * * * *